United States Patent [19]

Lee

[11] Patent Number: 5,822,365
[45] Date of Patent: Oct. 13, 1998

[54] VARIABLE CORRELATOR

[75] Inventor: Kyu-Don Lee, Seoul, Rep. of Korea

[73] Assignee: SamSung Electronics Co., Ltd., Suwon, Rep. of Korea

[21] Appl. No.: 781,979

[22] Filed: Dec. 27, 1996

[30] Foreign Application Priority Data

Dec. 30, 1995 [KR] Rep. of Korea ................ 1995 67776

[51] Int. Cl.⁶ ............................ G06F 17/15; H04B 1/69
[52] U.S. Cl. .................... 375/208; 375/343; 364/728.03; 342/378
[58] Field of Search ........................ 375/200, 208–210, 375/340, 343, 354, 367, 368; 364/604, 724.12, 728.01, 728.03, 728.07, 819, 820, 824; 342/189, 378

[56] References Cited

U.S. PATENT DOCUMENTS 5,218,562 6/1993 Basehore et al. ................ 364/728.03
5,654,980 8/1997 Latva-aho et al. ............... 375/208

*Primary Examiner*—Don N. Vo
*Assistant Examiner*—Amanda T. Le
*Attorney, Agent, or Firm*—Robert E. Bushnell, Esq.

[57] ABSTRACT

A digital complex correlator for a band-spread communication system having a variable correlation length wherein first and second channel input data are multiplied by first and second channel reference data in a multiplier to produce multiplication data. The multiplication data is then accumulated in an accumulator and the outputs from the accumulator are applied to an adder and squaring circuit via a correlation length control circuit.

7 Claims, 5 Drawing Sheets

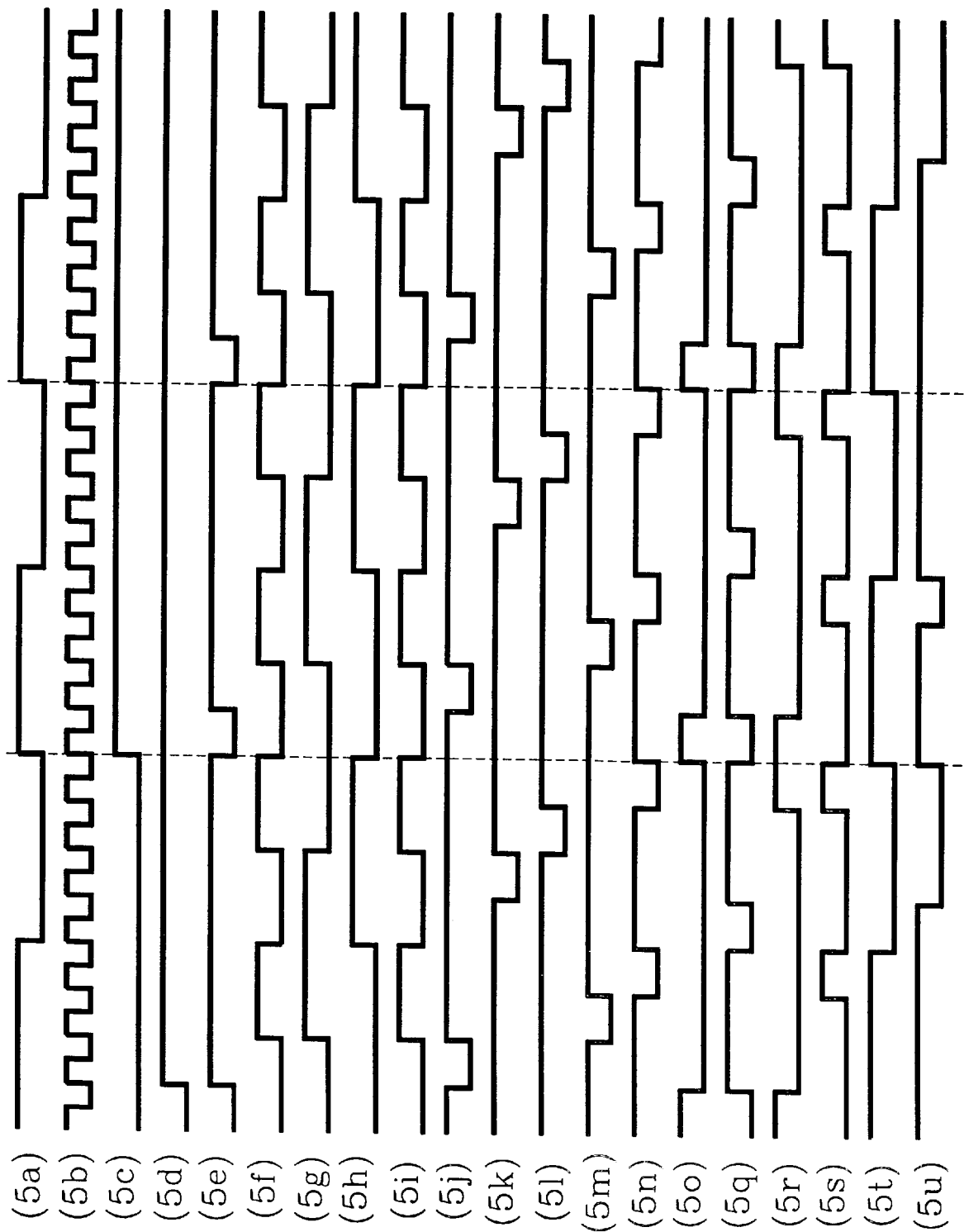

VARIABLE CORRELATOR

BACKGROUND OF THE INVENTION

1. Field of the Invention

The present invention relates to a variable correlator for a band-spread communication system, and more particularly to a correlator for performing correlating by variably controlling a correlation length.

2. Description of the Related Art

Generally, in a band-spread communication system, precise synchronization is an important factor in restoring an original signal from a band-spread signal. A receiver generates the same code as a spread code used for band-spreading at a transmitter, in which the spread code has a PN sequence type and a frequency skip pattern type. To allow this locally generated spread code to coincide with a code in a received signal is called synchronization. The synchronization is divided into an acquisition and a tracking according to the extent and sequence thereof. The acquisition is to have the code in the received signal and the locally generated spread code come close to each other within a half chip. The tracking is to prevent the acquisition signal from being non-synchronized and reduce a timing difference between the code in the received signal and the locally generated spread code. In the receiver of the band-spread communication system, the acquisition must precede the tracking. If the synchronization is failed on the way of performing the tracking, the acquisition is again performed. For such acquisition, the correlation must be performed for mixing the band-spread signal from the transmitter with the same code as that during the transmission to restore the original signal.

FIG. 1 shows a prior art digital complex correlator for performing such correlation.

Referring to FIG. 1, mixers 10, 20, 30, 40 mixes input data i(n), q(n) with reference data i_ref(n), q_ref(n) to generate first, second, third, and fourth mixed signals. Accumulators 50, 60, 70, 80 accumulates the first, second, third, and fourth mixed signals, respectively. The first and second accumulated signal outputs are added to each other at an adder 90 and then, squared at a squaring circuit 110. The squared signal output from the squaring circuit 110 is applied to an input terminal of an adder 130. Similarly, a squared signal output from a squaring circuit 120 is applied to another input terminal of the adder 130. The adder 130 adds the outputs from the squaring circuits 110, 120 to generate a correlation signal. The above stated complex correlator is widely used as a synchronization establishing circuit for establishing a symbol synchronization or a code synchronization in a receiver of a communication system using a quadrature modulation method. However, the prior art complex correlator undergoes an overload of calculation according to the correlation length. In most cases, however, the correlation length is fixed regardless of its uses, so that the circuit must be changed in case where the correlation value is to be changed varying the correlation length. Further, in case where the complex correlator is embodied with an ASIC (Application Specific Integrated Circuit), the chip must be replaced with new one whenever the correlation length is changed.

SUMMARY OF THE INVENTION

It is therefore an object of the present invention to provide a correlator performing correlation by variably controlling the correlation length.

According to an aspect of the present invention, a correlator in a band-spread communication system mixes sequential data input with reference data, and accumulates the mixed data by a number corresponding to a preset correlation length, thereby to vary the preset correlation length for performing correlation.

BRIEF DESCRIPTION OF THE DRAWINGS

The above and other objects, features and advantages of the present invention will become more apparent in the light of the following detailed description of an exemplary embodiment thereof taken with the attached drawings in which:

FIG. 5 is a timing diagram showing various waveforms generated from the digital complex correlator of FIG. 4.

DETAILED DESCRIPTION OF THE PREFERRED EMBODIMENT

Figure 1:
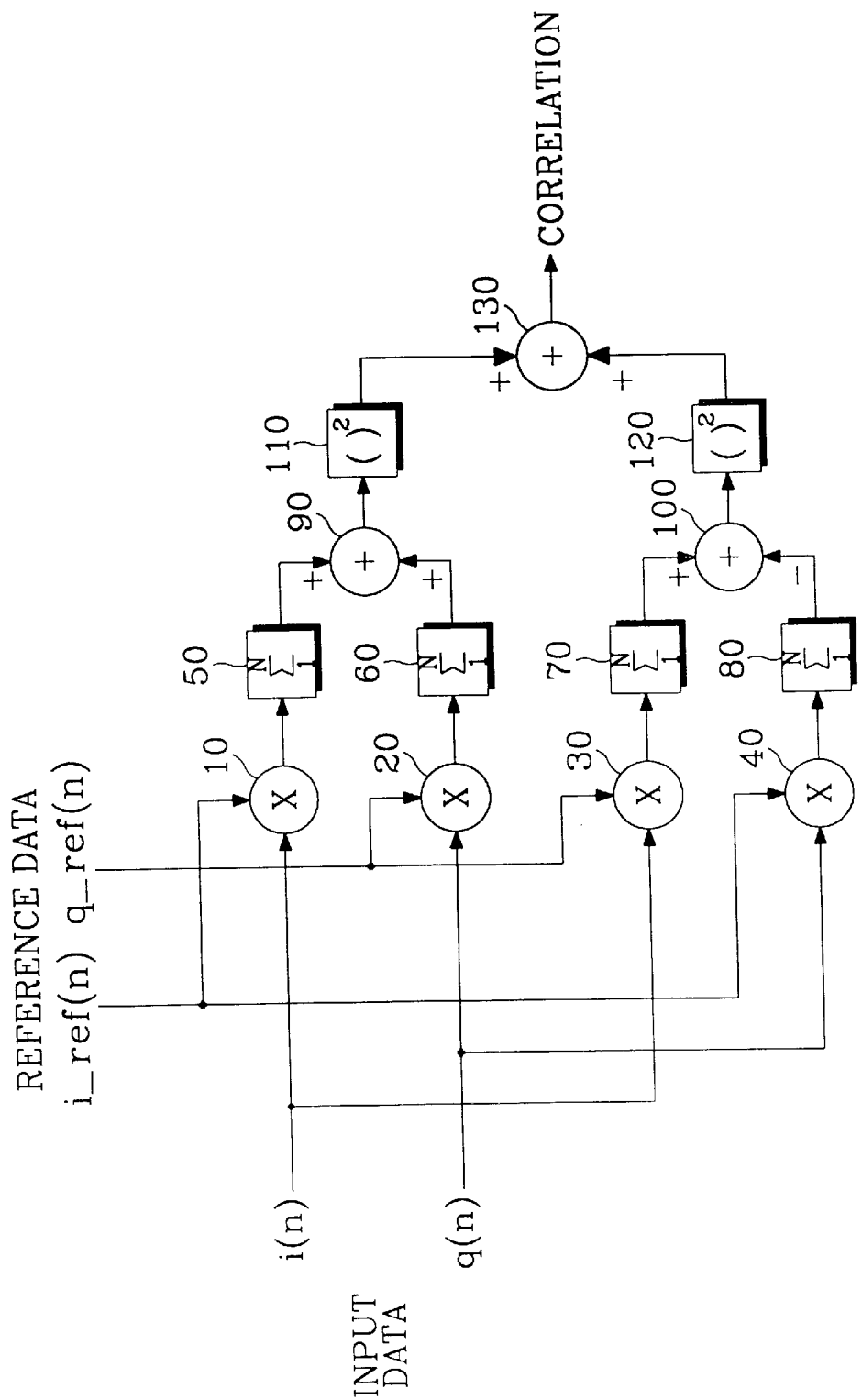
FIG. 1 is a circuit diagram of a complex correlator in a receiver of a band-spread communication system using a quadrature modulation method according to the prior art.

A preferred embodiment of the present invention will be described in detail hereinbelow with reference to the attached drawings, in which the like reference numerals used throughout the specification represent the like elements. Further, it should be clearly understood by those skilled in the art that many specifics such as the detailed circuit elements are shown only by way of an example to bring a better understanding of the present invention and the present invention may be embodied without the specifics. Moreover, it should be noted that detailed descriptions on the related prior art may be intentionally omitted if it is believed to be unnecessary in describing the concepts of the present invention. The terms used in the specification are defined in due consideration of the functions of the invention and are replaceable according to a usual practice or an intention of the user or chip designer. Preferably, the terms shall be defined based on the contents described throughout the specification.

Figure 2:
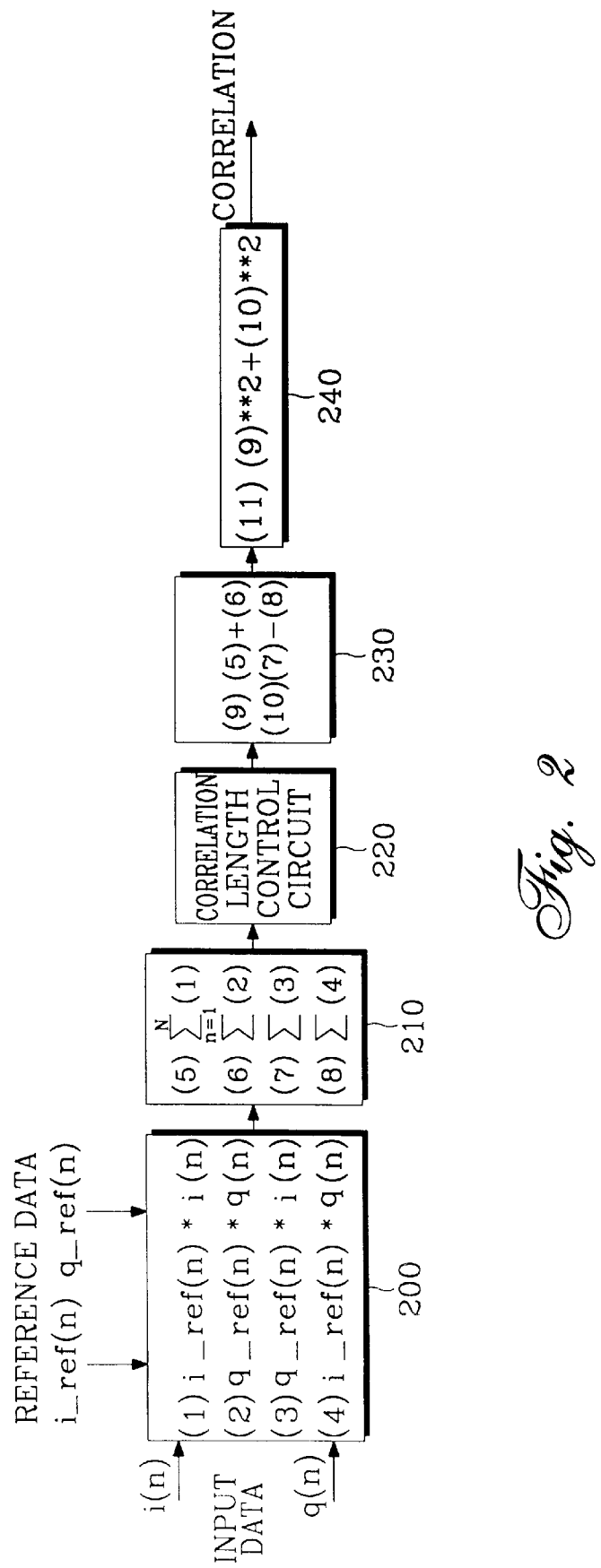
FIG. 2 is a schematic block diagram of a digital complex correlator according to an embodiment of the present invention.

Referring to FIG. 2, there is shown a schematic block diagram of a digital complex correlator according to the present invention.

The preferred embodiment of the present invention includes a correlation length control circuit 220 for controlling the correlation length at a middle of calculating the correlation to control the correlation length N according to the uses, so as to solve the problems of the prior art complex correlator of FIG. 1.

Figure 3:
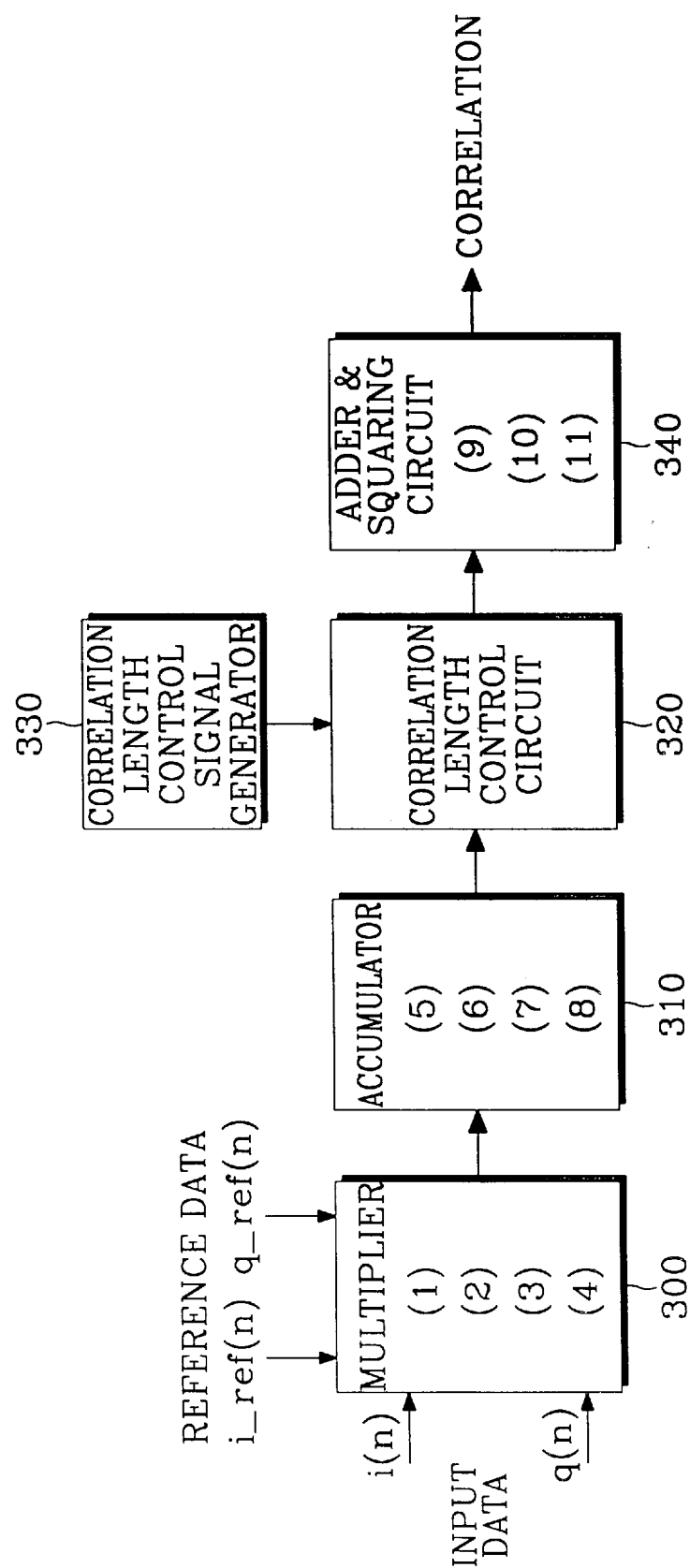
FIG. 3 is a schematic block diagram of a digital complex correlator according to another embodiment of the present invention.

Referring to FIG. 3, there is shown a digital complex correlator according to another embodiment of the present invention. Operations of the inventive digital complex correlator will be described in detail hereinbelow.

Now, referring to FIGS. 2 and 3, it is assumed that the input data is i(n)+jq(n), and reference data for calculating a complex correlation value in association with the input data is i_ref(n)+jq_ref(n).

Then, a multiplier (200, 300) multiplies the input data i(n)+jq(n) by the reference data i_ref(n)+jq_ref(n) and generates outputs as shown in the following formulas (1) through (4).

(1) i_ref(n)*i(n)

(2) q_ref(n)*q(n)

(3) q_ref(n)*i(n)

(4) i_ref(n)*q(n)

Thereafter, an accumulator (210, 310) accumulates the outputs from the multiplier 300 to generate the outputs as described in the following formulas (5) through (8).

(5) $\Sigma[i\_ref(n)*i(n)]$ (6) $\Sigma[q\_ref(n)*q(n)]$ (7) $\Sigma[q\_ref(n)*i(n)]$ (8) $\Sigma[i\_ref(n)*q(n)]$ Further, the outputs from the accumulator (210, 310) are applied to an adder and squaring circuit (230–240, 340) for generating outputs as described in the following formulas (9) and (10). Formula (11) represents the sum of the squared value of the formula (9) and the squared value of the formula (10).

(9) $\Sigma[i\_ref(n)*i(n)]+\Sigma[q\_ref(n)*q(n)]$

(10) $\Sigma[q\_ref(n)*i(n)]-\Sigma[i\_ref(n)*q(n)]$

(11) $\{\Sigma E[i\_ref(n)*i(n)]+\Sigma[q\_ref(n)*q(n)]\}^2 + \{\Sigma[q\_ref(n)*q(n)]-\Sigma[i\_ref(n)*q(n)]\}^2$ Therefore, the resultant correlation value is shown, as follows:

$$\begin{aligned}|\text{correlation}|^2 &= |\Sigma[i\_ref(n)\_jq\_ref(n)][i(n)+jq(n)]|^2 \\ &= |\Sigma[i\_ref(n)\_jq\_ref(n)][i(n)-jq(n)]|^2 \\ &= \{\Sigma[i\_ref(n)*i(n)] + \Sigma[i\_ref(n)*q(n)]\}^2\end{aligned}$$

A correlation length control circuit 220 comprises a correlation length control signal generator and a correlation length controller 320. Correlation length control signal generator 330 generates a control signal for controlling length of the correlation length. Namely, the length of the correlation length can be controlled according to the uses. A correlation length controller 320 controls correlating operation in response to the correlation length control signal. Namely, with reference to FIG. 3, the accumulator 310 delivers the results based on the formulas (5) through (8) to the adder and squaring device 340, upon completion of a calculation until n=N. While the adder and squaring device 340 performs a calculation of the formulas (9) through (11), the multiplier 300 receives new data to repeatedly calculate the correlation value beginning with n=1.

Figure 4:
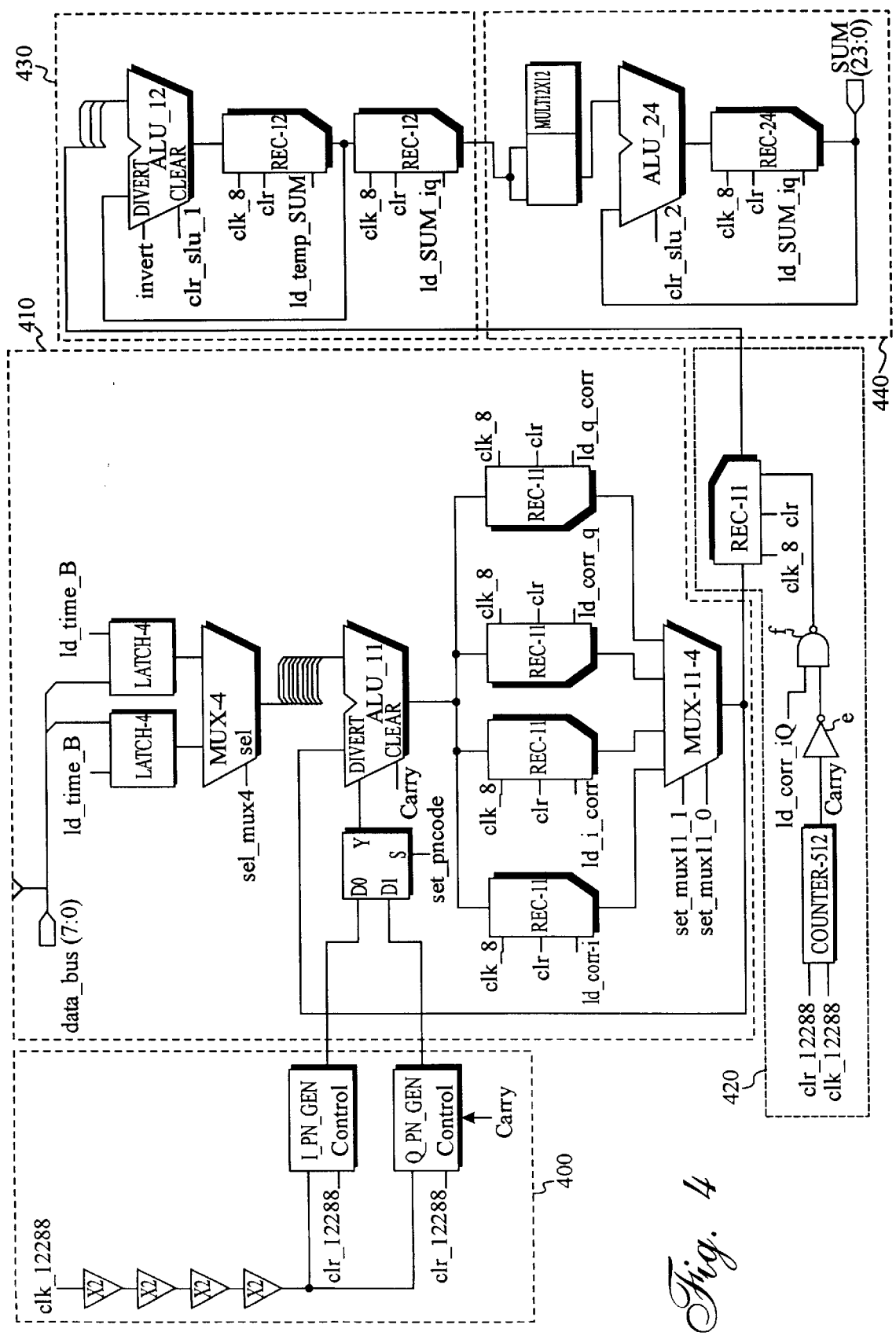
FIG. 4 is a detailed circuit diagram of the digital complex correlator of FIG. 3.

Referring to FIG. 4, there is shown a detailed circuit diagram of the digital complex correlator according to the preferred embodiment of the present invention for acquiring the code synchronization at a base band complexion apparatus of a CDMA (Code Division Multiple Access) cellular system.

Referring to FIG. 5, there is shown a various waveforms generated from the digital complex correlator of FIG. 4.

Now, referring to FIGS. 4 and 5, operations of the digital complex correlator according to the present invention will be described in detail hereinbelow.

A reference data generator 400 receives a clock clk_12288 shown in (5a) of FIG. 5 to generate reference data i_ref(n), jq_ref(n).

Now, configuration and operation of an accumulator 410 will be described in detail.

A multiplexer MUX-4 selects one of the input data i(n), jq(n) in response to a clock sel_mux4 shown in (5f) of FIG. 5 and applies the selected input data to an input terminal of an arithmetic unit ALU-11. At this moment, a multiplexer MX2 selects one of the reference data i_ref(n), jq_ref(n) in response to a clock sel_pncode shown in (5g) of FIG. 5 to generate a waveform shown in (5r) of FIG. 5 and the generated waveform is applied to an invert terminal of the arithmetic unit ALU-11. The arithmetic unit ALU-11 applies the reference data i_ref(n), jq_ref(n) to first through fourth registers a, b, c, d. The first register "a" outputs the reference data in association with clock signals clk_8, clr, ld_corr_i shown in (5b), (5d), (5j) of FIG. 5, respectively. The second register "b" outputs the reference data in association with the clock signals clk_8, clr, and a clock signal ld_i_corr shown in (5m) of FIG. 5. The third register "c" outputs the reference data in association with the clock signals clk_8, clr, and a clock signal ld_corr_q shown in (5k) of FIG. 5. Finally, the fourth register "d" outputs the reference data in association with the clock signals clk_8, clr, and a clock signal ld_q_corr shown in (5l) of FIG. 5. Then, a multiplexer MUX-11-4 outputs the signal outputs from the first through fourth registers "a", "b", "c", "d", in response to clock signals set_mux11_1, set_mux11_0 shown in (5h) and (5i) of FIG. 5, respectively.

A correlation length control circuit 420 is comprised of a correlation length control signal generator and a correlation length controller. The correlation length control signal generator includes a counter COUNTER-512 receiving clock signals clk_12288, clr_12288 shown in (5a) and (5c) of FIG. 5 for counting 512 numbers during one period, an invertor for inverting the signal output from the counter COUNTER_512 to generate an inverse counting signal, and a NAND gate "f" receiving the inverse counting signal at an input terminal thereof and receiving a clock signal shown in (5n) of FIG. 5 at another input terminal thereof, in order to generate the correlation length control signal. The correlation length controller is comprised of a register REG-11 receiving the correlation length control signal and the clock signals clk_8, clr, to apply the signal output from the accumulator 410 to an adder 430. The adder 430 adds (or accumulates) the output from the accumulator 410 and applies the added value to a squaring circuit 440. The squaring circuit 440 squares the output of the adder 430 to generate the correlation value.

It can be appreciated from the above descriptions that the correlation length can be readily varied according to the uses by simply changing the bit number "N" of the correlation length control signal generator (i.e., the N-counter COUNTER-512) among the whole complex correlator blocks.

As described theretofore, the present invention can variably control the correlation length to obtain a desirable correlation length, thereby solving the problems of the prior art device that the circuit must be changed or added in order to vary the correlation length, or the chip must be replaced with a new one in case of using the ASIC chip.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A correlator in a band-spread communication system, comprising:

means for multiplying first and second channel data inputs by first and second channel reference data to generate multiplication data;

means for accumulating said multiplication data by a bit number according to a preset correlation length, to generate accumulation data;

means for adding and squaring said accumulation data, to generate correlation data; and correlation length control means for varying said bit number corresponding to said preset correlation length.

2. The correlator as set forth in claim 1, wherein said means for multiplying generates said multiplication data according to the following formulas:

i_ref(n)*i(n)

q_ref(n)*q(n)

q_ref(n)*i(n)

i_ref(n) *q(n), wherein said first channel data input is represented by i(n), said second channel data input is represented by q(n), said first channel reference data is represented by i_ref(n) and said second channel reference data is represented by q_ref(n).

3. The correlator as set forth in claim 2, wherein said means for accumulating generates said accumulation data according to the following formulas:

$\Sigma(i\_ref(n)*i(n))$ $\Sigma(q\_ref(n)*q(n))$ $\Sigma(q\_ref(n)*i(n))$ $\Sigma(i\_ref(n)*q(n))$.

4. A correlator in a band-spread communication system, comprising:

means for multiplying input data i(n)+q(n) reference data i_ref(n)+q_ref(n) to generate multiplication data according to the following formulas:

i_ref(n)*i(n)

q_ref(n)*q(n)

q_ref(n)*i(n)

i_ref(n)*q(n);

means for accumulating said multiplication data to generate accumulation data according to the following formulas:

$\Sigma(i\_ref(n)*i(n))$ $\Sigma(q\_ref(n)*q(n))$ $\Sigma(q\_ref(n)*i(n))$ $\Sigma(i\_ref(n)*q(n))$;

correlation length control means for varying a correlation length of said accumulated data; and means for adding and squaring said accumulation data varied according to said correlation length control means, to generate correlation data.

5. The correlator as set forth in claim 4, said correlation length control means comprising:

a correlation length controller for receiving said accumulated data and outputting said accumulated data in response to a correlation length control signal; and a correlation length control signal generator for generating said correlation length control signal for controlling said correlation length controller.

6. The correlator as set forth in claim 5, said correlation control signal generator comprising:

a counter for generating a count signal while counting to a predetermined value within a predetermined time period in response to received first and second clock signals;

an inverter for inverting said count signal;

a NAND gate having a first input terminal connected to an output terminal of said inverter and a second input terminal connected to receive a third clock signal, said NAND gate producing said correlation length control signal.

7. The correlator as set forth in claim 6, said correlation length controller comprising a shift register receiving said accumulation data and outputting said accumulation data to said means for adding and squaring in response to a fourth clock signal and said correlation length control signal.

* * * * *